(12) United States Patent
Kitajima et al.

(10) Patent No.: US 6,201,040 B1
(45) Date of Patent: Mar. 13, 2001

(54) ANTIFOULING COATING COMPOSITION

(75) Inventors: Masakazu Kitajima; Hiroshi Yamashita; Hiroyuki Kawai, all of Kanagawa (JP)

(73) Assignee: Kansai Paint Co. Ltd, Amagasaki (JP)

( * ) Notice: Subject to any disclaimer, the term of this patent is extended or adjusted under 35 U.S.C. 154(b) by 0 days.

(21) Appl. No.: 09/379,915

(22) Filed: Aug. 24, 1999

(30) Foreign Application Priority Data

Aug. 25, 1998 (JP) ................................................ 10-237866

(51) Int. Cl.[7] ...................................................... C09D 5/16
(52) U.S. Cl. ......................... 523/122; 523/177; 524/430; 524/431; 524/432; 524/556; 524/558
(58) Field of Search ..................................... 523/122, 177; 524/82, 183, 399, 401, 404, 418, 430, 431, 432, 556, 558

(56) References Cited

U.S. PATENT DOCUMENTS

| 4,914,141 | * | 4/1990 | Matsuo et al. | 523/122 |
| 5,866,632 | * | 2/1999 | Hasimoto et al. | 523/118 |
| 5,880,173 | * | 3/1999 | Matsuda et al. | 523/122 |

FOREIGN PATENT DOCUMENTS

| 0 133 779 | 3/1985 | (EP) . |
| 0 698 643 A2 | 2/1996 | (EP) . |
| 0 779 304 A1 | 6/1997 | (EP) . |
| 2 167 075 | 5/1986 | (GB) . |
| 2 320 251 | 6/1998 | (GB) . |
| 62-57464 | 3/1987 | (JP) . |
| 62-115072 | * 5/1987 | (JP) . |
| 96013864 | * 2/1996 | (JP) . |
| 8-209005 | 8/1996 | (JP) . |
| 8-277372 | 10/1996 | (JP) . |
| 09208860 | * 8/1997 | (JP) . |

OTHER PUBLICATIONS

Database WPI Section Ch, Week 9419 Derwent Publications Ltd., London, GB; Class A82, AN 1994–15619 XP002125671 & JP 06 100405 A (Yoshitomi Pharm Ind KK), (Apr. 12, 1994) *abstract* .

Database WPI Section Ch, Week 9917 Derwent Publications Ltd., London, GB; Class A82, AN 1994–291094 XP002125670 & JP 06 220362 A (Aug. 9, 1994) * abstract* .

Database WPI Section Ch, Week 9744 Derwent Publications Ltd., Londong, GB; Class A26, AN 1997–474227 XP002124669 & JP 09 208860 A (Toupe KK), Aug. 12, 1997 *abstract* .

* cited by examiner

*Primary Examiner*—Edward J. Cain
*Assistant Examiner*—Katarzyna Wyrozebski
(74) *Attorney, Agent, or Firm*—Rader, Fishman & Grauer

(57) ABSTRACT

An antifouling coating composition which makes it possible to control the dissolution rate of a coating film and which can exert antifouling properties for a long period of time. An antifouling coating composition comprising an antifouling resin (A) obtained by reacting a base resin including, in one molecule, a carboxyl group and a group having a polyalkylene glycol structure with an oxide or a hydroxide of a divalent or more metallic atom in the presence of water in an amount of 1 to 30% by weight of the solid content of the base resin, and an antifouling agent (B).

24 Claims, No Drawings

ANTIFOULING COATING COMPOSITION

BACKGROUND OF THE INVENTION

1. Field of the Invention

The present invention relates generally to an antifouling coating composition which can control the dissolution rate of a coating film and which can exert antifouling properties for a long period of time.

2. Description of Related Art

Heretofore, a resin having a carboxylate of tin has been used as a binder for an antifouling coating composition. However, since such resins can be harmful, the replacement of the tin carboxylate resin with another resin has been required in some instances. Thus, various resins, mainly having carboxylates of copper and zinc, have been investigated. For example, some typical alternative resins have been suggested in Japanese Patent Application Laid-Open Nos. 57464/1987 and 209005/1996, both of which are incorporated herein by reference in their entirety.

However, it is difficult to obtain sufficient control the erosion rate of a coating film obtained from each of these resins, and furthermore, while such resins can exert antifouling properties to some extent, a problem can arise that the antifouling properties cannot be maintained over an extended time period.

SUMMARY OF THE INVENTION

An object of the present invention is to provide an antifouling coating composition which permits control of the dissolution rate of a coating film and which can exert antifouling properties for a long period of time.

The present invention is directed to an antifouling coating composition comprising an antifouling resin (A) obtained by reacting a base resin including, in one molecule, a carboxyl group and a group having a polyalkylene glycol structure of the following formula (1)

$$(C_mH_{2m}O)_nR^1 \qquad (1)$$

wherein $R^1$ is hydrogen, or a straight-chain, branched or cyclic alkyl group or aralkyl group having 1 to 20 carbon atoms, m is an integer of 1 to 4, and n is an integer of 1 to 100, with an oxide or a hydroxide of a metallic atom that is at least divalent in the presence of water, the water being included in an amount of 1 to 30% by weight based on the weight of the solids of the base resin, and an antifouling agent (B).

Additional advantages, features and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

DETAILED DESCRIPTION OF A PREFERRED EMBODIMENT

In the present invention, an antifouling resin (A) can be obtained by reacting a base resin including, in one molecule, a carboxyl group and a group having a polyalkylene glycol structure represented by the above-mentioned general formula (1) with an oxide or a hydroxide of a metallic atom that is at least divalent in the presence of water in an amount of 1 to 30% by weight based on the weight of the solids of the base resin.

The above-mentioned base resin possesses the group having the polyalkylene glycol structure represented by the above-mentioned general formula (1), which improves self-polishing property without impairing the physical properties of the coating composition. In the above-mentioned general formula (1), m is in integer of 1 to 4, and n is an integer of 1 to 100, respectively. If m is in excess of 4 or if n is in excess of 100, the improvement effect of the self-polishing property may not be as dramatic or noticeable.

Examples of the above-mentioned base resin include one or more of polyester resins, polyurethane resins and polyamide resins. A particularly suitable base resin is an acrylic polymer obtained by copolymerizing a carboxyl group-containing monomer and another monomer copolymerizable therewith, or by copolymerizing a carboxyl group-containing monomer, a monomer having a group with a polyalkylene glycol structure and another monomer copolymerizable therewith in the presence of a radical polymerization initiator in accordance with any customer's method, such as by employing solution polymerization.

Examples of the above-mentioned carboxyl group containing monomer include one or more of (meth)acrylic acid, crotonic acid, itaconic acid, maleic acid and fumaric acid.

Examples of the above-mentioned monomer having the group with the polyalkylene glycol structure include one or more of methoxyethyl (meth)acrylate, hydroxyethyl (meth)acrylate, methoxypolyethylene glycol (meth) acrylate, nonylphenoxypolyethylene glycol (meth)acrylate and methoxypolyethylene glycol (meth) acrylate.

Examples of the above-mentioned other monomer copolymerizable therewith include one or more of vinyl aromatic compounds such as styrene, Q-methylstyrene, vinyltoluene and achlorostyrene; alkyl esters and cycloalkyl esters having 1 to 24 carbon atoms of acrylic acid and methacrylic acid such as methyl (meth)acrylate, ethyl (meth)acrylate, n-propyl (meth)acrylate, iso-propyl (meth)acrylate, (n-, iso- and tert- )butyl (meth)acrylate, hexyl (meth)acrylate, cyclohexyl (meth)acrylate, 2-ethylhexyl (meth)acrylate, n-octyl (meth)acrylate, decyl (meth)acrylate, lauryl (meth)acrylate, stearyl (meth)acrylate, isobornyl (meth)acrylate; perfluoroalkyl (meth)acrylates such as perfluorobutylethyl (meth) acrylate, perfluoroisononylethyl (meth) acrylate and perfluorooctylethyl (meth)acrylate; and fluoroolefins. In addition, a so-called macromonomer which is a polymer of one or more monomers thereof and which has a polymerizable unsaturated group at one terminal end can also be mentioned as a suitable polymerizable monomer.

Examples of the solvent which can be used in the solution polymerization of the above-mentioned monomer mixture include one or more of alkylbenzene derivatives such as benzene, toluene and xylene; acetate solvents such as ethyl acetate, propyl acetate, butyl acetate, amyl acetate, methoxybutyl acetate, methyl acetoacetate, ethyl acetoacetate, methyl CELLOSOLVE ACETATE, CELLOSOLVE ACETATE, diethylene glycol acetate monomethyl ether and CARBITOL ACETATE; ether solvents such as dioxane, ethylene glycol diethyl ether, ethylene glycol dibutyl ether and diethylene glycol diethyl ether; alcoholic solvents such as methanol, ethanol, propanol, isopropanol and (n-, iso- and tert-)butanols; and ketone solvents such as acetone, methyl ethyl ketone, methyl isobutyl ketone and cyclohexanone. They can be used singly or in the form of a mixture of two or more thereof.

Examples of the radical polymerization initiator include one or more of peroxides such as benzoyl peroxide, di-t-butyl hydroperoxide, tert-butyl hydroperoxide, cumyl peroxide, cumene hydroperoxide, diisopropylbenzene hydroperoxide, tertbutyl peroxybenzoate, lauryl peroxide, acetyl peroxide and tert-butylperoxy-2-ethyl hexanoate; and azo compounds such as α,α'-azobisisobutyronitrile, α,α'-azobis-2-methylbutyronitrile, azobisdimethylvaleronitrile and azobiscyclohexanecarbonitrile.

The weight-average molecular weight of the base resin obtained as described above in some embodiments is usually in the range of 1,000 to 200,000, preferably 2,000 to 100,000, more preferably 2,000 to 50,000. If the weight-average molecular weight is less than 1,000, or about 1,000 drying properties may be poor, so that weathering resistance and durability of the coating film deteriorate. On the other hand, if the molecular weight is more than 200,000 or about 200,000, the finished appearance may tend to deteriorate, as well as the coating film may lack sufficient self-polishing and sufficient antifouling properties may be difficult to obtain.

Furthermore, if the above-mentioned base resin includes a group having a polyalkylene glycol structure, in order to optimize the improvement of self-polishing performance, preferably at least 0.005 mol of an alkylene glycol unit is contained in 100 g of the base resin.

In the present invention, the resin (A) can be obtained, for example, by reacting the base resin obtained as described above with an oxide or a hydroxide of an at least divalent metal in the presence of water in an amount of 1 to 30% by weight based on the weight of the solids in the base resin, usually at 50 to 200° C. for a period of 1 to 20 hours. At the initial stage of the reaction, a powdery metallic compound is generally merely dispersed in the base resin, but with the progress of the reaction, the whole reaction system becomes transparent. To this reaction system, a suitable amount of a polar solvent may be added if desired for any reason. Examples of suitable polar solvent include one or more of alcoholic solvents, ketone solvents, ester solvents and ether solvents.

The above-mentioned oxide or hydroxide of the divalent metal can be used without particular restriction, but from the viewpoints of cost, harmfulness, reactivity and the like, an oxide or a hydroxide of one or more of copper, zinc, calcium, magnesium and iron is preferable in some cases.

In this process, water has the effect of accelerating the reaction and simultaneously preventing gelation. However, if the amount of water is less than 1% or about 1% by weight, these effects may be difficult to observe. Even if the amount of water is more than 30% or about 30% by weight, the improvement effects are less dramatic. After the completion of the reaction, excessive water which does not dissolve in the system can be easily removed in any desired manner, such as by reduction of pressure, decantation or by heating.

Here, an advantageous blend ratio of the carboxyl group to the metallic compound in the base resin can preferably be in the range of 0.1 to 5.0 carboxyl group/metallic compound in terms of a molar ratio. If this molar ratio is lower than 0.1 or about 0.1, a long time may be required for the reaction, which is not practical. On the other hand, if the molar ratio is higher than 5.0 or about 5.0, the amount of free carboxylic acid is larger than the amount of the metal carboxylate (an effective component), such that it may be inconvenient and/or difficult over time to obtain desired self-polishing performance.

In the resin (A) obtained as described above, the metal carboxylate portion is formed within the molecule and/or between molecules so that an equivalent ratio ($COOM^{2+}$) of the carboxyl group to the at least divalent metal in the base resin may be in the range of 0.1 to 5, preferably 0.25 to 2.

Furthermore, it is desirable in some instances that the resin (A) have a solubility parameter (SP) value in the range of 10.0 to 12.0, preferably 10.5 to 11.5. If the SP value is less than 10.0 or about 10.0, solubility in seawater may be poor, and if the (SP) is more than 12.0 or about 12.0, the water resistance of the obtained coating film may be less acceptable and the film may inconveniently swell in seawater. The solubility parameter (SP) is the value calculated from the fundamental structural formula of a compound by the value of $\Delta ei$ and $\Delta Vi$ at 25° C. proposed by Fedors in the following formula (*Gijutsusha No Tameno Jitsugaku Kobunshi* (*Practical Learning Polymer for Technicians*), pages 71 to 77, edited by Kodansha Scientific).

$$SP\ Value\ (\delta) = \sqrt{(\Sigma \Delta ei/\Sigma \Delta Vi)}(cal/cm^3)^{1/2}$$

wherein $\Delta ei$ is evaporation energy of an atom or an atomic group, and $\Delta Vi$ is a mol volume of an atom or an atomic group.

In the present invention, examples of suitable antifouling agents (B) include one or more of copper antifouling agents such as cuprous oxide, copper thiocyanate and copper powder; pyrithion compounds such as zinc pyrithion and copper pyrithion; trialkylboron compounds such as triphenylboron-pyridine salts; isothiazoline compounds such as 4,5-dichloro-2-n-octyl-4-isothiazoline-3-one; nitrogen containing sulfur-based antifouling agents such as ethylenebis (dithiocarbamic acid) zinc and tetramethylthiuram disulfide, nitrile compounds such as tetrachloroisophthalonitrile, benzothiazole compounds, triazine compounds, urea compounds, maleimide compounds, N-haloalkylthio compounds, bactericides such as tetracycline compounds and tetrachloromethylsulfonylpyridine, and zinc oxide. Among these compounds, it is desirable to suitably select and use a compound or compounds which do not prevent or even reduce the solubility of the resin (A) in seawater. However, any conventional antifouling gent can be used.

A blend amount of the above-mentioned antifouling agent (B) is suitably in the range of 10 to 300 parts by weight based on 100 parts by weight of the resin content. If the blend amount of the antifouling agent (B) is less than 10 parts by weight or about 10 parts by weight, the antifouling properties in sea water where fouling is severe may be difficult to secure, and if the amount is more than 300 parts by weight or about 300 parts by weight, the physical properties of the coating film after being immersed in the seawater may be undesirably impaired.

The antifouling coating composition of the present invention contains the above-mentioned components (A) and (B), and if necessary or desireable for any reason, the antifouling coating composition may also optionally contain one or more of a pigment, a plasticizer, a solvent, and usual additives which are useful in antifouling coating compositions and aqueous coating compositions. Typically, the antifouling coating compositions may be used for coating on marine vessels, fishing nets, pipes or something others which are submerged into water.

Hereinafter, the present invention will be described in more detail in accordance with examples. Incidentally, the undermentioned "part(s)" and "%" mean "part(s) by weight" and "% by weight," respectively.

PREPARATION OF A BASE RESIN

MANUFACTURING EXAMPLE 1

In a reactor equipped with a thermometer, a thermostat, a stirrer, a reflux condenser and a dropping pump were placed 23 parts of xylene, 30 parts of butyl acetate and 30 parts of n-butanol, and after the mixture was heated up to 105° C. with stirring, 108 parts of a mixture of monomers and a polymerization initiator shown in Table 1 were added dropwise at a constant speed over 4 hours by the utilization of the dropping pump, while a temperature of 105° C. was maintained. After the completion of the dropping, the solution was maintained at 105° C. for 30 minutes and the stirring was continued. Afterward, a solution obtained by dissolving 1 part of an additional polymerization initiator in 6 parts of xylene was added dropwise at a constant speed over 1 hour, and the solution was further maintained at 105° C. for 1 hour, thereby completing the reaction. The resultant base resin solution was a homogeneous transparent solution in which the nonvolatile solids content was 53%, it had an acid value of 100 mg KOH/g of the resin, and the Gardner viscosity measured with a Gardner-Holdt viscometer was C.

MANUFACTURING EXAMPLES 2 to 6

The same procedure as in Manufacturing Example 1 was conducted except that a mixture of monomers and a polymerization initiator, and an additional polymerization initiator were blended as shown in Table 1 to obtain each base resin solution. The property values of the obtained resin solutions are also shown in Table 1. Incidentally, in Preparation Example 5, gelation occurred, so that the measurement of the properties was impossible.

TABLE 1

| | Manufacture of Base Resin | | | | | |
|---|---|---|---|---|---|---|
| | 1 | 2 | 3 | 4 | 5 | 6 |
| BLEND | | | | | | |
| Acrylic Acid | | 18 | 8 | 9 | | |
| Methacrylic Acid | 15 | | 9 | 10 | | 25 |
| Hydroxyethyl Methacrylate | | 15 | | 10 | 40 | |
| Methoxyethyl Acrylate | 40 | | | 10 | | |
| Methoxypolyethylene Glycol Methacrylate (n = 9) | | 7 | 20 | 10 | | |
| Styrene | | 10 | | 10 | | 5 |
| Ethyl Acrylate | 40 | | 33 | 16 | 40 | 30 |
| n-Butyl Acrylate | | 40 | | 15 | | 30 |
| Methyl Methacrylate | 5 | 10 | 30 | 10 | 5 | 10 |
| Zinc Methacrylate | | | | | 15 | |
| Polymerization Initiator (Azobisisobutyronitrile) | 8 | 6 | 4 | 8 | 8 | 6 |
| Additional Polymerization Initiator (Azobisisobutyronitrile) | 1 | 1 | 1 | 1 | 1 | 0.5 |
| PROPERTY VALUES | | | | | | |
| Nonvolatile Content (%) | 53 | 53 | 53 | 53 | — | 53 |
| Gardner Viscosity | C | 0 | C | 3 | — | F |
| Weight-Average Molecular Weight | 6000 | 8000 | 10000 | 6000 | — | 8000 |
| Acid Value of Resin (mgKOH/g) | 100 | 143 | 120 | 126 | — | 165 |

PREPARATION OF AN ANTIFOULING RESIN (A)

PREPARATION EXAMPLE 1

7.5 parts of zinc oxide, 5.3 parts of water, 7.5 parts of butyl acetate and 7.5 parts of n-butanol were added to 20 parts of the base resin solution obtained in the above-mentioned Manufacturing Example 1, and stirring was then continued at 100° C. for 20 hours to obtain a transparent resin solution (A-1) having a Gardner viscosity of T.

PREPARATION EXAMPLES 2 TO 7

The same procedure as in Preparation Example 1 was conducted except that a base resin solution, zinc oxide, water and a solvent were blended as shown in Table 2 to obtain solutions (A-2) to (A-7) which were all transparent. The property values of the obtained resin solutions are also shown in Table 2.

TABLE 2

| | Preparation of Antifouling Resin | | | | | | |
|---|---|---|---|---|---|---|---|
| | 1 | 2 | 3 | 4 | 5 | 6 | 7 |
| Name of Antifouling Resin Solution | A-1 | A-2 | A-3 | A-4 | A-5 | A-6 | A-7 |
| BLEND | | | | | | | |
| Base Resin Component | | | | | | | |
| Manufacturing Example 1 | 200 | 200 | | | | | |
| Manufacturing Example 2 | | | 200 | | | | |
| Manufacturing Example 3 | | | | 200 | 200 | | |
| Manufacturing Example 4 | | | | | | 200 | |
| Manufacturing Example 6 | | | | | | | 200 |
| Metallic Compound | | | | | | | |
| Zinc Oxide | 7.5 | | 12 | 9 | | | 13 |
| Calcium Hydroxide | | 10 | | | | | |
| Copper Hydroxide | | | | | 9 | 5.5 | |
| Water | | | | | | | |
| Deionized Water | 5.3 | 6.0 | 5.5 | 5.5 | 6.0 | 5.5 | 5.5 |
| Solvent | | | | | | | |
| Butyl Acetate | 7.5 | 7.5 | | 10 | 7.5 | | 5 |
| n-Butanol | 7.5 | 7.5 | 10 | | 7.5 | 7.5 | 5 |

TABLE 2-continued

| | Preparation of Antifouling Resin | | | | | | |
|---|---|---|---|---|---|---|---|
| | 1 | 2 | 3 | 4 | 5 | 6 | 7 |
| Xylene | | | | | | | 5 |
| Methyl Isobutyl Ketone | | | 5 | | | 7.5 | |
| PROPERTY VALUE | | | | | | | |
| Nonvolatile Content (%) | 50.3 | 50.5 | 50.3 | 50.7 | 50.5 | 50.7 | 50.1 |
| Appearance of Solution | Transp. | Transp. | Transp. | Transp. | Transp. | Transp. | Transp. |
| Gardner viscosity | T | U | W | N | O | P | Y |

PREPARATION OF AN ANTIFOULING COATING COMPOSITION

EXAMPLE 1

50 parts of the transparent resin solution (A-1) obtained in the above-mentioned Preparation Example 1, 2.5 parts of a chlorinated paraffin, 40 parts of cuprous oxide, 2 parts of Ion oxide Red, 0.5 part of "AEROSIL #200" (trade name, made by Degsa Co., Ltd., silica powder) and 5 parts of xylene were mixed and dispersed by a paint conditioner to thereby obtain an antifouling coating composition.

EXAMPLES 2 TO 12 AND COMPARATIVE EXAMPLES 1 TO 3

The same procedure as in Example 1 was conducted except that each blend shown in Table 3 was used, thereby obtaining each antifouling coating composition. Incidentally, Note 1 in Table 3 is as follows.

TEST OF ANTIFOULING PROPERTIES

The antifouling coating composition obtained above was applied onto a test plate having a size of 100×300×3.2 mm to which an anticorrosive coating treatment was made in advance with a vinyl tar coating composition. A dry film of the antifouling coating with thickness of 200 mm, followed by drying, was formed onto the test plate. The thus obtained test plate was immersed at a depth of 1 m in Osaka Bay in Takaishi City, Osaka and antifouling properties after 12 months and 24 months were evaluated in terms of the biological foul area ratio (%). The results are shown in Table 3.

By employing an antifouling coating composition of the present invention, the inclusion of the instant resin component permits the formation of a metal carboxylate structure in the molecule and/or between the molecules, which makes it possible to control the dissolution rate of a coating film. In addition, by also employing an antifouling component, antifouling properties can be exerted for a long period of time.

Additional advantages, features and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

The priority document of Japanese Patent Application No. 10-237866 filed Aug. 25, 1999 is incorporated herein by reference in its entirety.

TABLE 3

| | Example | | | | | | | | | | | | Comp. Example | | |
|---|---|---|---|---|---|---|---|---|---|---|---|---|---|---|---|
| | 1 | 2 | 3 | 4 | 5 | 6 | 7 | 8 | 9 | 10 | 11 | 12 | 1 | 2 | 3 |
| BLEND | | | | | | | | | | | | | | 50 | 50 |
| Resin Solution | | | | | | | | | | | | | | | | |
| A-1 | 50 | 50 | 50 | 50 | | | | | | | | | | | |
| A-2 | | | | | 50 | 50 | 50 | | | | | | | | |
| A-3 | | | | | | | | 50 | | | | | | | |
| A-4 | | | | | | | | | 50 | 50 | | | | | |
| A-5 | | | | | | | | | | | 50 | | | | |
| A-6 | | | | | | | | | | | | 50 | | | |
| A-7 | | | | | | | | | | | | | 50 | | |
| Antifouling Agent | | | | | | | | | | | | | | | |
| Cuprous Oxide | 40 | | | | 40 | | | 40 | 40 | | 40 | 40 | 40 | | |
| Zinc Pyrithion | | 10 | | | | 10 | | | | | | | | | |
| Triphenylboronpyridine Salt | | | 10 | | | | 10 | | | 10 | | | | | |
| SEA-NINE 211 (Note 1) | | | | 33 | | | | | | | | | | | |
| Chlorinated Paraffin | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 |
| Ion Oxide Red | 2 | 2 | 2 | 2 | 2 | 2 | 2 | 2 | 2 | 2 | 2 | 2 | 2 | 2 | 0 |
| AEROSIL #200 | 0.5 | 0.5 | 0.5 | 0.5 | 0.5 | 0.5 | 0.5 | 0.5 | 0.5 | 0.5 | 0.5 | 0.5 | 0.5 | 0.5 | 0 |

TABLE 3-continued

|  | Example |  |  |  |  |  |  |  |  |  |  |  | Comp. Example |  |  |
|---|---|---|---|---|---|---|---|---|---|---|---|---|---|---|---|
|  | 1 | 2 | 3 | 4 | 5 | 6 | 7 | 8 | 9 | 10 | 11 | 12 | 1 | 2 | 3 |
| ANTIFOULING PROPERTIES (%) | | | | | | | | | | | | | | | |
| 12 months | 0 | 0 | 0 | 0 | 0 | 0 | 0 | 0 | 0 | 0 | 0 | 0 | 0 | 5 | 0 |
| 24 months | 0 | 0 | 0 | 3 | 0 | 0 | 0 | 0 | 0 | 0 | 10 | 10 | 20 | 40 | 15 |

Note 1: "SEA-NINE 211", made by Rohm and Hass Co., Ltd., 4,5-dichloro-2-n-octyl-4-isothiazoline-3-one

What is claimed is:

1. An antifouling coating composition, comprising:
   an antifouling resin (A) obtained by reacting in the presence of water a base resin including, in one molecule, a carboxyl group and a group having a polyalkylene glycol structure of formula (1)

$$(C_mH_{2m}O)_nR^1 \tag{1}$$

wherein $R^1$ is hydrogen, or a straight-chain, branched or cyclic alkyl group or aralkyl group having 1 to 20 carbon atoms, m is an integer of 1 to 4, and n is an integer of 1 to 100, with an oxide or a hydroxide of a metallic atom that is at least divalent, in an amount of 1 to 30% by weight based on the weight of the solids of the base resin, and
   an antifouling agent (B).

2. An antifouling coating composition according to claim 1, wherein the metallic atom comprises one or more selected from the group consisting of copper, zinc, calcium, magnesium and iron.

3. An antifouling coating composition according to claim 1, wherein the base resin comprises a vinyl polymer having an acid value of 10 to 300 mg KOH/g.

4. An antifouling coating composition according to claim 1, wherein the weight-average molecular weight of the base resin is in the range of 1,000 to 200,000.

5. An antifouling coating composition according to claim 1, wherein the base resin includes at least 0.005 mol of an alkylene glycol unit in the formula (1) in 100 g of the base resin.

6. An antifouling coating composition according to claim 1, wherein the resin (A) has a solubility parameter of 10.0 to 12.0.

7. An antifouling coating composition according to claim 1, wherein the antifouling agent (B) comprises a copper-based antifouling agent.

8. An antifouling coating composition according to claim 1, wherein the antifouling agent (B) comprises a pyrithione compound.

9. An antifouling coating composition according to claim 1, wherein the antifouling agent (B) comprises a trialkylboron compound.

10. An antifouling coating composition according to claim 1, wherein the antifouling agent (B) comprises an isothiazoline compound.

11. An antifouling coating composition according to claim 1, wherein the content of the antifouling agent (B) is in the range of 10 to 300 parts by weight based on 100 parts by weight of the solids of the resin (A).

12. A method for preparing an antifouling coating composition which includes an antifouling resin (A), the method comprising:
   reacting a base resin including, in one molecule, a carboxyl group and a group having a polyalkylene glycol structure of formula (1)

$$(C_mH_{2m}O)_nR^1 \tag{1}$$

wherein $R^1$ is hydrogen, or a straight-chain, branched or cyclic alkyl group or aralkyl group having 1 to 20 carbon atoms, m is an integer of 1 to 4, and n is an integer of 1 to 100, with an oxide or hydroxide of a metallic atom to form said antifouling resin (A); and
   combining said resin (A) with an antifouling agent (B).

13. An article intended for contact with sea water that is coated with said antifouling coating composition according to claim 1.

14. A method according to claim 12, wherein said reacting step is conducted with said based resin and said oxide or hydroxide of said metallic atom being in the presence of said water.

15. A method according to claim 14, wherein the metallic atom comprises one or more selected from the group consisting of copper, zinc, calcium, magnesium and iron.

16. A method according to claim 14, wherein the base resin comprises a vinyl polymer having an acid value of 10 to 300 mg KOH/g.

17. A method according to claim 14, wherein the weight-average molecular weight of the base resin is in the range of 1,000 to 200,000.

18. A method according to claim 14, wherein the base resin includes at least 0.005 mol of an alkylene glycol unit in the formula (1) in 100 g of the base resin.

19. A method according to claim 14, wherein the resin (A) has a solubility parameter of 10.0 to 12.0.

20. A method according to claim 14, wherein the antifouling agent (B) comprises a copper-based antifouling agent.

21. A method according to claim 14, wherein the antifouling agent (B) comprises a pyrithione compound.

22. A method according to claim 14, wherein the antifouling agent (B) comprises a trialkylboron compound.

23. A method according to claim 14, wherein the antifoulding agent (B) comprises an isothiazoline compound.

24. A method according to claim 14, wherein the content of the antifouling agent (B) is in the range of 10 to 300 parts by weight based on 100 parts by weight of the solids of the resin (A).

* * * * *

UNITED STATES PATENT AND TRADEMARK OFFICE
CERTIFICATE OF CORRECTION

PATENT NO. : 6,201,040 B1
DATED : March 13, 2001
INVENTOR(S) : Masakazu Kitajima et al.

It is certified that error appears in the above-identified patent and that said Letters Patent is hereby corrected as shown below:

<u>Column 9, claim 1,</u>
Line 27, should read --

1. An antifouling coating composition, comprising:

an antifouling resin (A) obtained by reacting in the presence of water a base resin including, in one molecule, a carboxyl group and a group having a polyalkylene glycol structure of formula (1)

$$(C_mH_{2m}O)_nR^1 \qquad (1)$$

wherein $R^1$ is hydrogen, or a straight-chain, branched or cyclic alkyl group or aralkyl group having 1 to 20 carbon atoms, m is an integer of 1 to 4, and n is an integer of 1 to 100, with an oxide or a hydroxide of a metallic atom that is at least divalent in the presence of water, said water being present in an amount of 1 to 30% by weight based on the weight of the solids of the base resin, and an antifouling agent (B)

Signed and Sealed this

Twenty-seventh Day of November, 2001

*Attest:*

NICHOLAS P. GODICI
*Attesting Officer*  *Acting Director of the United States Patent and Trademark Office*